United States Patent [19]
Lenormand et al.

[11] Patent Number: 5,859,610
[45] Date of Patent: Jan. 12, 1999

[54] METHOD AND A SYSTEM FOR LOCATING GROUND EQUIPMENT TRANSMITTING VIA SATELLITES

[75] Inventors: Régis Lenormand, Blagnac; Henri Favaro, Lanta; Thierry Quignon; Christian Rigal, both of Toulouse; Charles Villemur, Portet S/Garonne, all of France

[73] Assignee: Alcatel N.V., Rijswijk, Netherlands

[21] Appl. No.: 948,485

[22] Filed: Oct. 10, 1997

Related U.S. Application Data

[63] Continuation of Ser. No. 490,571, Jun. 15, 1995, abandoned.

[30] Foreign Application Priority Data

Jun. 16, 1994 [FR] France ................................ 94 07383

[51] Int. Cl.$^6$ .................................................. H04B 7/185
[52] U.S. Cl. ........................... 342/354; 342/356; 342/373
[58] Field of Search .................................... 342/352, 354, 342/356, 357, 373

[56] References Cited

U.S. PATENT DOCUMENTS

| | | |
|---|---|---|
| 4,090,199 | 5/1978 | Archer . |
| 4,276,553 | 6/1981 | Schaefer . |
| 4,335,388 | 6/1982 | Scott et al. . |
| 4,882,588 | 11/1989 | Renshaw et al. ........................ 342/373 |
| 4,907,004 | 3/1990 | Zacharatos et al. ..................... 342/373 |
| 4,931,802 | 6/1990 | Assal et al. .............................. 342/356 |
| 4,965,732 | 10/1990 | Roy, III et al. .......................... 364/460 |
| 5,262,789 | 11/1993 | Silverstein .............................. 342/368 |
| 5,396,256 | 3/1995 | Chiba et al. ............................. 342/372 |
| 5,459,668 | 10/1995 | Dogan et al. ............................ 364/456 |

FOREIGN PATENT DOCUMENTS

| | | |
|---|---|---|
| 0407243A1 | 1/1991 | European Pat. Off. . |
| 0632286A2 | 1/1995 | European Pat. Off. . |
| WO8707031 | 11/1987 | WIPO . |

OTHER PUBLICATIONS

*Patent Abstracts of Japan*, vol. 5, No. 21 (P–048) 7 Feb. 1981 & JP–A–55 149 065 (Mitsubishi Electric Corp.) 20 Nov. 1980.

*Patent Abstracts of Japan*, vol. 14, No. 564 (E–1013) 14 Dec. 1990 & JP–A–02 244 802 (Mitsubishi Electric Corp.) 28 Sep. 1990.

*IEEE Transactions on Antennas and Propagation*, vol. AP–34, No. 3, Mar. 1986, pp. 276–280, Schmidt, "Multiple Emitter Locationand Signal Parameter Estimation".

*Primary Examiner*—Theodore M. Blum
*Attorney, Agent, or Firm*—Sughrue, Mion, Zinn, Macpeak & Seas, PLLC

[57] ABSTRACT

A method and a system for locating ground equipment transmitting signals to a geostationary satellite, the method and the system being based on identifying the arrival directions of such signals within the coverage zone of the satellite. In the method, the arrival directions of the signals are identified by using a beam-forming active-module array antenna system on board the satellite, the system being controlled to define simultaneous beams in the radiation pattern of the antenna, the beams being superposed on one another with small offsets, the superposed beams corresponding to a limited analysis zone being illuminated within the coverage zone of the satellite, the system further being associated with a digital processing program which identifies the arrival directions of the signals which are received in the analysis zone.

6 Claims, 3 Drawing Sheets

METHOD AND A SYSTEM FOR LOCATING GROUND EQUIPMENT TRANSMITTING VIA SATELLITES

This is a Continuation of application Ser. No. 08/490,571 filed Jun. 15, 1995, now abandoned.

FIELD OF THE INVENTION

The invention relates to a method and a system for locating ground equipment that is transmitting signals to a geostationary satellite, such equipment being located by identifying the arrival directions of such signals within the coverage zone of the satellite.

The invention applies in particular to civil telecommunications space systems implementing geostationary satellites which make it possible to relay transmitting ground equipment, such as ground equipment used for broadcasting television programs, or ground equipment making it possible to set up telephone calls between mobile, portable, and fixed terminals.

BACKGROUND OF THE INVENTION

Considerable progress has been made in miniaturizing ground equipment designed to transmit signals to geostationary satellites. Such equipment is now commercially available and is known under the acronym "VSAT".

Civil telecommunications space network operators are finding that interference signals are being transmitted from unauthorized ground equipment fraudulently taking advantage of satellites operated by such operators.

Such interference signals are mixed with or even superimposed on the telecommunications signals normally received by the geostationary satellites of such space networks.

Situations are currently being encountered in which satellites in such space networks receive tens of interference signals in addition to legitimate signals.

As a result, the operators of such networks suffer considerable financial losses, and their customers suffer a reduction in transmission quality because of interference between the interference signals and the legitimate signals.

Therefore, operators currently need to eliminate or at least to reduce the number of such interference signals transmitted towards and to the geostationary satellites in their civil telecommunications space networks.

To this end, it is envisaged for each geostationary satellite to identify the arrival directions of the interference signals within the coverage zone of the satellite, so as to use the arrival directions to locate the ground equipment transmitting such interference signals, and then to have such equipment removed.

Systems are already known for identifying the arrival directions of signals arriving within the coverage zone of a satellite among legitimate other signals but with much higher power levels, i.e. about 20 dB to 25 db above the power levels of the legitimate other signals. In practice, the signals whose arrival directions are to be identified are distinguished from the other signals by their power levels.

Currently implemented known systems for identifying the arrival directions of signals are based on the use of sensors having overall coverage (isotropic over the coverage) installed on the satellite, the number of sensors to be provided depending on the number of signals whose arrival directions are to be identified. To identify the arrival directions of two signals, five sensors must be provided, and to identify the arrival directions of ten signals, twenty-one sensors must be provided.

Such a facility tends to become very complicated and bulky as soon as the number of sensors increases. Above about ten sensors in service, it is considered that the volume of calculations to be performed makes the facility too complex for it to be implemented in a payload on board a geostationary satellite.

In the current context, the interference signals generally have physical characteristics that are quite close to those of the legitimate telecommunications signals, and, in any event, not different enough from those of the legitimate signals to envisage distinguishing the interference signals on the basis of their power levels.

OBJECTS AND SUMMARY OF THE INVENTION

An object of the invention is to provide a method of locating grounding equipment that is transmitting, to a satellite, signals having similar characteristics, in particular with respect to power level, the equipment being located by identifying the arrival directions of such signals within the coverage zone of the satellite.

To this end, the invention provides such a method wherein the arrival directions of the signals are identified by using a beam-forming active-module array antenna system on board the satellite, the system being controlled to define simultaneous beams in the radiation pattern of the antenna, the beams being superposed on one another with small offsets, the superposed beams corresponding to a limited analysis zone being illuminated within the coverage zone of the satellite, the system further being associated with a digital processing program which identifies the arrival directions of the signals which are received in the analysis zone.

To form beams, the signals delivered by the antenna elements configured in an array are used to provide a sum signal that is the sum of all of the signals after they have been weighted with appropriate coefficients.

When a phase relationship exists between the incident waves picked up by the antenna elements, it can be demonstrated that, under certain conditions, the sum signal is then the signal that would be obtained by the array antenna formed of the antenna elements but with an illumination relationship defined by the weighting coefficients.

Forming beams by calculation consists in digitally calculating the weighted sum of the signals delivered by the antenna elements.

Furthermore, electronic scanning is performed by applying a variable and controlled phase-shift to the signals delivered by the antenna elements so as to produce a beam or "main lobe" whose direction forms a variable angle with the central axis of the array, which angle is modified as a function of needs.

A digital-calculation beam-forming array antenna is disclosed in Document EP-A-407 243.

By superposing such beams (or spot apertures), it is possible to overcome interference from signals arriving around the analysis zone, such signals being received with attenuation of close to 20 db relative to the signals arriving in the aperture of the spot. This then makes it possible to apply digital processing for identifying the arrival directions of a plurality of signals arriving in the analysis zone. The small offsets between the beams make it possible to recover differential characteristics serving to distinguish between the signals received in the analysis zone.

The invention proposes to establish a map for each satellite, on which map all of the items of ground equipment transmitting signals arriving in the coverage zone of the satellite are plotted on the basis of the arrival directions of the signals. With the location of the items of ground equipment that are authorized to transmit being known, the unauthorized items of ground equipment can firstly be identified, and then be located accurately on the ground, e.g. by means of radio direction finding.

In practice, it is necessary to have a larger number of beam-formers than signals to be distinguished within an analysis zone. This number is such that n+2 beam-formers are required per axis of a reference frame (in azimuth and in elevation) in order to distinguish between $\underline{n}$ different signals.

Given that the number of unauthorized ground transmitters to be located for any one satellite might be relatively high (several hundreds), it is not feasible to use hundreds of beam-formers on board the satellite.

In an advantageous implementation of the invention, the system is controlled such that the analysis zone is displaced within the coverage zone so as to scan the entire coverage zone of the satellite automatically.

An advantage of the invention is that it does not significantly increase the complexity of the payload on board the geostationary satellite, provided that the satellite is designed to include an electronic scanning active array antenna for telecommunications purposes. In order to implement the "locating" function, it is merely necessary to add beam-formers that are dedicated to that function, in parallel with those of the telecommunications function, and that do not degrade the performance levels thereof. By means of such a method, it is possible to obtain quite high resolution on the ground (about 5 km to 10 km).

The invention is applicable to all types of active antennas, regardless of whether they are direct-radiation arrays or antennas in which active focal arrays illuminate reflectors.

The invention also provides a beam-forming active-module array antenna system, the system being under the control of a program which is organized firstly to define simultaneous beams in the radiation pattern of the antenna, the beams being superposed on one another with small offsets, the superposed beams corresponding to a limited analysis zone being illuminated within the coverage zone of the antenna, and secondly to implement digital processing so as to identify the arrival directions of the signals which are received in the analysis zone.

The invention further provides both a satellite including such an antenna system, and also a system for locating ground equipment transmitting signals to such a satellite in geostationary orbit, the satellite being in communication with the ground so as to supply data identifying the arrival directions of such signals within the coverage zone of the antenna system of the satellite.

Overall, such a system contributes to improving the quality of the telecommunications links from the ground to the satellite in geostationary orbit, in particular with respect to the gain over temperature ratio of the satellite. The improvement which can be obtained in the figure of merit of the satellite can be evaluated on the basis of an example of a transmission link in X band, in the vicinity of 8 GHz to 9 GHz, and of a satellite whose coverage zone is typically about one degree. Assuming a gain of 40 db at the edge of coverage for the antenna, it is possible to obtain a gain over temperature figure of merit of about 10 dbK with an active antenna having a reflector. With isotropic sensors over terrestrial coverage, the gain over temperature ratio of the satellite would be only about −10 dbK under the same conditions.

BRIEF DESCRIPTION OF THE DRAWINGS

Other characteristics and advantages of the invention appear on reading the following description of an implementation of the invention given with reference to the accompanying drawings, in which.

MORE DETAILED DESCRIPTION

In accordance with the invention, the payload of a geostationary satellite includes a system for identifying the arrival directions of signals so as to locate equipment transmitting signals from the ground within the coverage zone of the satellite, the satellite normally being used for telecommunications purposes.

The identification system is based on an antenna system having analog or digital-calculation beam-forming active modules.

The antenna system comprises an array antenna 1 constituted by antenna elements (only a limited number of antenna elements is shown so as to keep the drawings clear).

Figure 3:
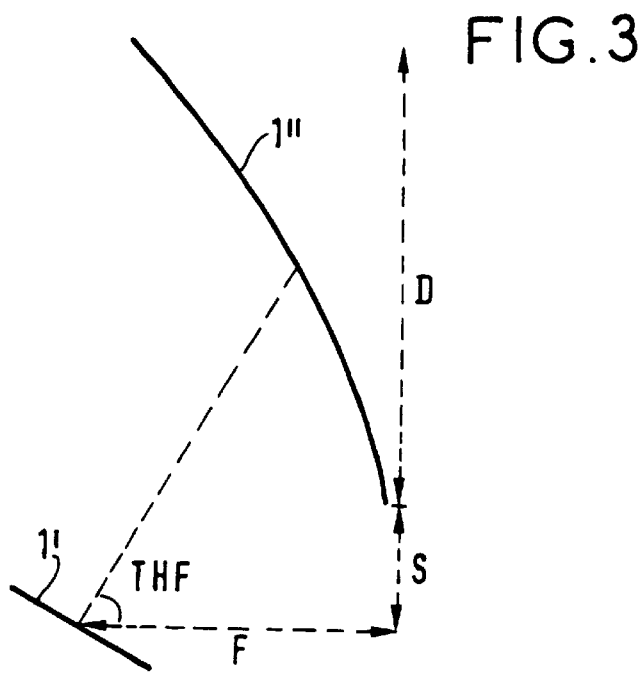
FIG. 3 shows an embodiment of the array antenna.

An example of an antenna suitable for the locating system of the invention is shown diagrammatically in FIG. 3. In this example, the active array 1' illuminates a reflector 1". This antenna is constituted by a reflector that has a diameter D of 2.2 meters (m) and that is offset by a distance S of 0.6 m. The focal length F is 1.54 m with an aiming angle THF relative to the normal of 60°. The array includes 217 sources 1 of 1.2 lambda each.

Figure 1:
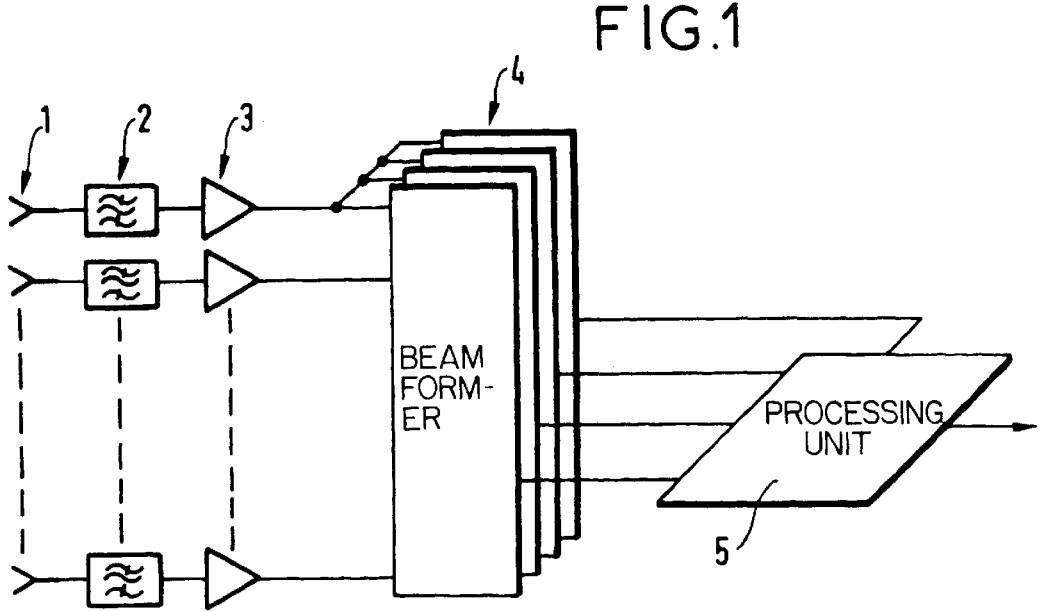
FIG. 1 shows the principle of a payload of a telecommunications satellite including a locating system of the invention.

The architecture of the payload is shown in FIG. 1.

Each antenna element 1 in the array is associated with a conventional filter 2 followed by a conventional low-noise amplifier 3. In the present case, the array of antenna elements operate in reception for performing the locating function. It is to be understood that the same array of antenna elements may also be used in reception and/or in transmission for telecommunications functions assigned to the payload of the satellite.

The low-noise amplifiers 3 are associated with beam-formers such as 4 (only four formers being shown) which are dedicated to the locating function, the beam-formers being connected in parallel to the outputs of the amplifiers 3.

Each beam-former 4 comprises an array of active modules (not shown), each active module comprising an electronic phase-shifter and an attenuator, and one active module being provided per antenna element 1. Each beam-former outputs a microwave signal resulting from the sum of the output signals from the active modules of the beam-former in compliance with an illumination relationship which corresponds to weighting coefficients applied to the active modules.

The illumination relationship is such that it defines a narrow beam in the radiation pattern of the antenna typically corresponding to the aperture of a spot whose aiming direction depends on the weighting coefficients.

The microwave signals output by the various beam-formers 4 are then digitized in parallel in a processing unit 5 so as to produce digital signals in quadrature.

The processing unit 5 generates covariance products of the digital signals so as to form a covariance matrix serving as a basis for an algorithm for identifying the arrival directions of signals received within the coverage zone of the antenna. Data representative of the arrival directions of the signals received by the satellite is recovered from the processing unit 5 which sends the data to the ground so as to be used in locating the ground equipment that has transmitted such signals.

In accordance with the invention, the sets of weighting coefficients applied to the active modules of the beam-formers 4 are chosen such that narrow beams are obtained simultaneously in the radiation pattern of the antenna, the beams being superposed on one another with small offsets.

Figure 2:
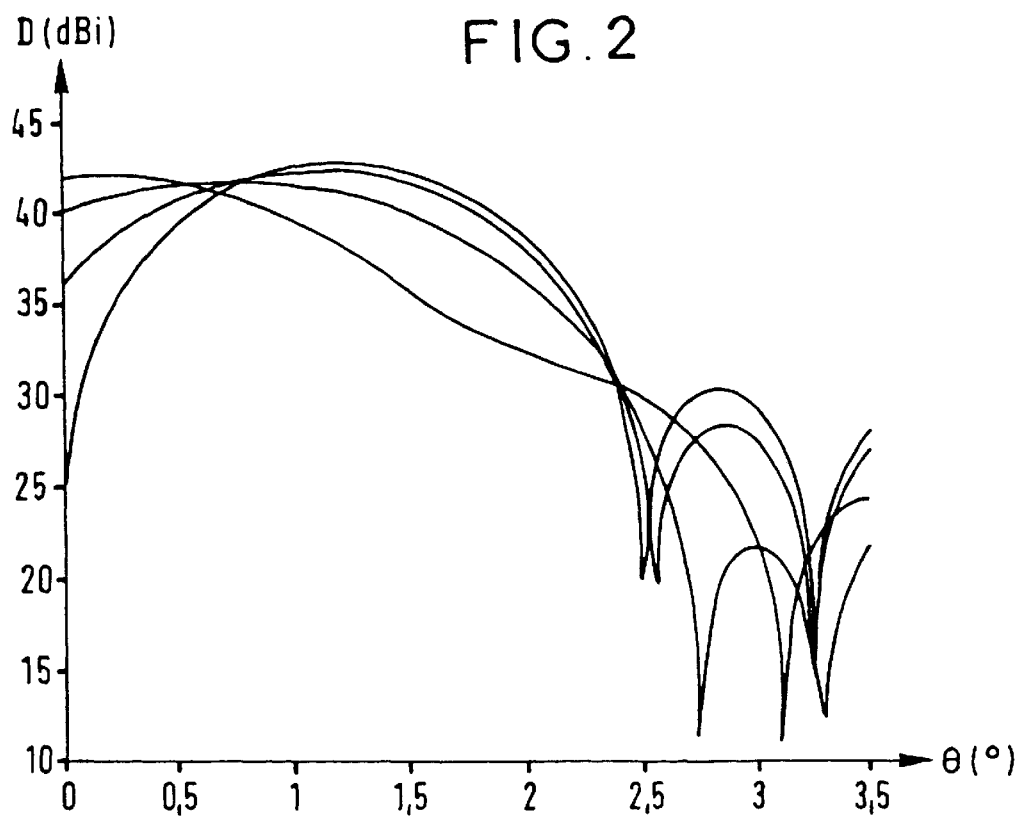
FIG. 2 shows a radiation pattern of an active array antenna associated with four beam-formers in accordance with the invention.

As shown in FIG. 2, four beams output by the four beam-formers 4 shown in FIG. 1 are superposed on one another with small offsets, the maxima of the beams being offset uniformly by an angular value that is much smaller than the width of a beam, e.g. by 0.3°.

The four beams correspond to a limited analysis zone being illuminated within the coverage zone of the antenna. In fact, the analysis zone substantially corresponds to the aperture of a beam.

Figure 4:
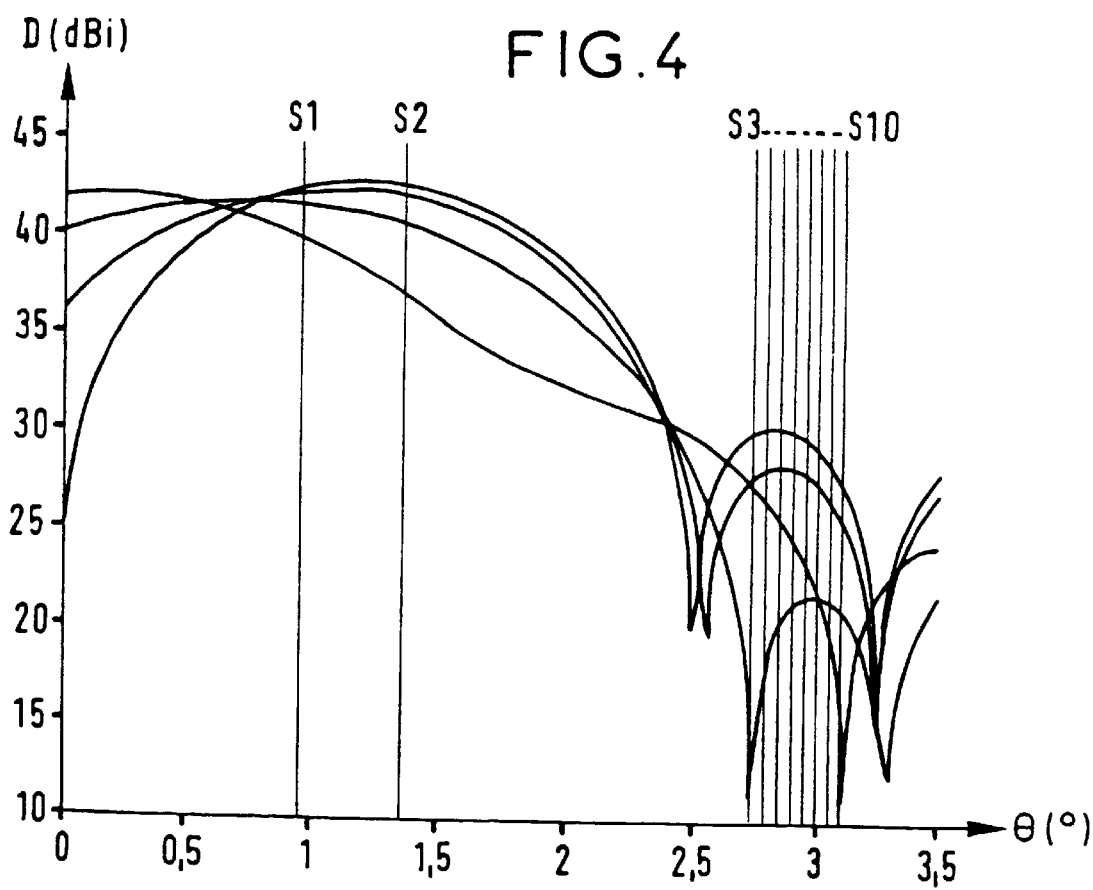
FIG. 4 shows the radiation pattern of the FIG. 3 antenna, with interference signals plotted on the pattern.

In FIG. 4, ten signals S1–S10 which are of the same amplitude, and whose frequencies are uniformly distributed within a processing band of 40 MHz are shown in relation to the four beams of the pattern of the antenna. Because the above-mentioned weighting coefficients are chosen such that the beams are superposed on one another, the signals S3–S10 arriving outside of the analysis zone are received in the processing unit 5 with attenuation that is high enough relative to signals S1–S2 to enable signals S1 and S2 to be distinguished.

The algorithm for identifying the arrival directions of the signals received in the analysis zone is known as "MUSIC". This algorithm is described in the document IEEE TRANSACTIONS ON ANTENNAS AND PROPAGATION, VOL. AP. 34, No. 3, MARCH 1986; "Multiple Emitter Location and Signal Parameter Estimation" by Ralph O. Schmidt. This algorithm is based on processing the covariance matrix of the received signals. The principle of such processing is recalled below.

After initial processing, the signals are sorted according to which one of the two characteristic sub-spaces of the system they belong, namely the sub-space characteristic of signals and the sub-space characteristic of noise. The principle of the sorting is based initially on searching for the characteristic values of the system, and then on comparing the characteristic values with a separation threshold.

Figure 5:
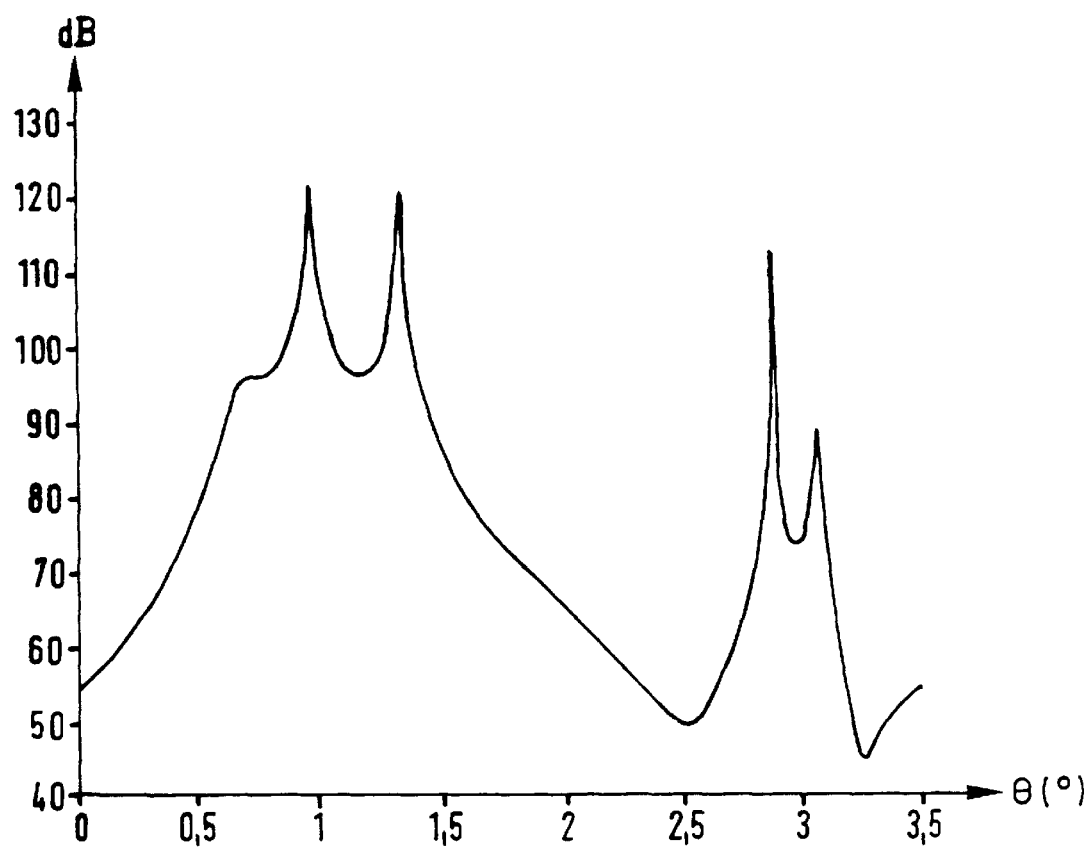
FIG. 5 shows the performance levels obtained with the locating system of the invention.

FIG. 5 shows the results obtained by combining the antenna system of the invention with processing of the digital signals using the "MUSIC" algorithm. The X-axis gives, in degrees, estimated values for the arrival directions of the signals received in the analysis zone. It can be observed that the two signals S1 and S2 arriving in the analysis zone have been located without bias.

In order to sweep the entire coverage zone of the antenna, the antenna system is organized so as to apply successive sets of weighting coefficients to the beam-formers (in fact to the active modules thereof) in compliance with a pre-established program so as to displace the analysis zone within the coverage zone so that, by applying the "MUSIC" algorithm to-the successive analysis zones, it is possible to obtain the arrival directions of all of the signals arriving within the coverage zone of the antenna.

In order to identify the arrival directions of two different signals in the analysis zone by using the "MUSIC" algorithm, it is necessary to implement seven beam-formers. By displacing the analysis zone within the coverage zone of the antenna, the seven beam-formers nevertheless make it possible to identify signals arriving over the entire coverage zone of the antenna. Therefore, it can be understood that a relatively small number of beam-formers is sufficient to locate several hundred ground transmitters scattered throughout the coverage zone of the antenna.

We claim:

1. A method of locating ground equipment that is transmitting signals to a geostationary satellite, the method including identifying arrival directions of such signals within a coverage zone of the geostationary satellite, wherein the arrival directions of the signals are identified by using a beam-forming active-module antenna system on board the satellite, the system being controlled to define simultaneous beams in a radiation pattern of an antenna, the beams being superimposed on one another with small offsets, the superimposed beams corresponding to a limited analysis zone which is illuminated within the coverage zone, and by using a digital processing program which identifies the arrival directions of the signals which are received in the analysis zone using said superimposed beams.

2. The method according to claim 1, in which the system is controlled such that the analysis zone is displaced within the coverage zone so as to scan the entire coverage zone automatically.

3. The method according to claim 2, in which the beams are superimposed on one another with an angular offset between maxima that is much smaller than the width of the beam.

4. A beam-forming active-module antenna system comprising an antenna array and a digital processing unit, said system being under a control of a program which is organized to define simultaneous beams in the radiation pattern of said antenna array, said beams being superimposed on one another with small offsets and corresponding to a limited analysis zone that is illuminated within a coverage zone, wherein said digital processing unit identifies arrival directions of signals which are received in the analysis zone using said superimposed beams.

5. A geostationary satellite including a beam-forming active module antenna system comprising an antenna array and a digital processing unit, said system being under the control of a program which is organized to define simultaneous beams in a radiation pattern of said antenna array, said beams being superimposed on one another with small offsets and corresponding to a limited analysis zone that is illuminated within a coverage zone, wherein said digital processing unit identifies arrival directions of signals which are received in the analysis zone using said superimposed beams.

6. A geostationary satellite according to claim 5, wherein the satellite is in communication with at least one ground station so as to produce data identifying the arrival directions of such signals within the coverage zone of the satellite and the location of a source of the signals within the coverage zone of the satellite.

* * * * *